US006210453B1

United States Patent
Noronha

(10) Patent No.: US 6,210,453 B1
(45) Date of Patent: Apr. 3, 2001

(54) FIGURINE-CONTAINED ARTIFICIAL FIRE-LOG

(76) Inventor: John L. Noronha, 5 Ravenview Drive, Whitby, Ontario (CA), L1R 1Y2

(*) Notice: Subject to any disclaimer, the term of this patent is extended or adjusted under 35 U.S.C. 154(b) by 0 days.

(21) Appl. No.: 09/502,295

(22) Filed: Feb. 11, 2000

(51) Int. Cl.$^7$ .................................................. C01L 5/00
(52) U.S. Cl. .................................................. 44/530; 44/535
(58) Field of Search .................................................. 44/530, 535

(56) References Cited

U.S. PATENT DOCUMENTS 1,645,206 * 10/1927 Stevens .................................................. 44/530

* cited by examiner

Primary Examiner—Margaret Medley
Assistant Examiner—Cephia D. Toomer

(57) ABSTRACT

A figurine-contained artificial fire-log for providing not only firewood but also providing a collectable item. The figurine-contained artificial fire-log includes an elongate flammable body being formed of particulate material such as compressed wood chips and sawdust and also being formed of a binder such as a chemical agent including wax; and a collectable figurine being disposed inside the elongate flammable body and including an animal-shaped figure such as an elephant which is made of fire-resistant material such as cast iron, cement, and ceramic.

13 Claims, 1 Drawing Sheet

FIGURINE-CONTAINED ARTIFICIAL FIRE-LOG

BACKGROUND OF THE INVENTION

1. Field of the Invention

The present invention relates to a surprise-containing fire-log and more particularly pertains to a new figurine-contained artificial fire-log for providing not only firewood but also providing a collectable item.

2. Description of the Prior Art

The use of surprise-containing fire-log is known in the prior art. More specifically, surprise-containing fire-log heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,062,655; U.S. Pat. No. 3,637,355; U.S. Pat. No. 4,883,498; U.S. Pat. No. 4,040,796; U.S. Pat. No. Des. 364,201; and U.S. Pat. No. Des. 397,780.

While these devices fulfill their respective, particular objectives and requirements, the aforementioned patents do not disclose a new figurine-contained artificial fire-log. The inventive device includes an elongate flammable body being formed of particulate material such as compressed wood chips and sawdust and also being formed of a binder such as a chemical agent including wax; and a collectable figurine being disposed inside the elongate flammable body and including an animal-shaped figure such as an elephant which is made of fire-resistant material such as cast iron, cement, and ceramic.

In these respects, the figurine-contained artificial fire-log according to the present invention substantially departs from the conventional concepts and designs of the prior art, and in so doing provides an apparatus primarily developed for the purpose of providing not only firewood but also providing a collectable item.

SUMMARY OF THE INVENTION

In view of the foregoing disadvantages inherent in the known types of surprise-containing fire-log now present in the prior art, the present invention provides a new figurine-contained artificial fire-log construction wherein the same can be utilized for providing not only firewood but also providing a collectable item.

The general purpose of the present invention, which will be described subsequently in greater detail, is to provide a new figurine-contained artificial fire-log which has many of the advantages of the surprise-containing fire-log mentioned heretofore and many novel features that result in a new figurine-contained artificial fire-log which is not anticipated, rendered obvious, suggested, or even implied by any of the prior art surprise-containing fire-log, either alone or in any combination thereof.

To attain this, the present invention generally comprises an elongate flammable body being formed of particulate material such as compressed wood chips and sawdust and also being formed of a binder such as a chemical agent including wax; and a collectable figurine being disposed inside the elongate flammable body and including an animal-shaped figure such as an elephant which is made of fire-resistant material such as cast iron, cement, and ceramic.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new figurine-contained artificial fire-log which has many of the advantages of the surprise-containing fire-log mentioned heretofore and many novel features that result in a new figurine-contained artificial fire-log which is not anticipated, rendered obvious, suggested, or even implied by any of the prior art surprise-containing fire-log, either alone or in any combination thereof.

It is another object of the present invention to provide a new figurine-contained artificial fire-log which may be easily and efficiently manufactured and marketed.

It is a further object of the present invention to provide a new figurine-contained artificial fire-log which is of a durable and reliable construction.

An even further object of the present invention is to provide a new figurine-contained artificial fire-log which is susceptible of a low cost of manufacture with regard to both materials and labor, and which accordingly is then susceptible of low prices of sale to the consuming public, thereby making such figurine-contained artificial fire-log economically available to the buying public.

Still yet another object of the present invention is to provide a new figurine-contained artificial fire-log which provides in the apparatuses and methods of the prior art some of the advantages thereof, while simultaneously overcoming some of the disadvantages normally associated therewith.

Still another object of the present invention is to provide a new figurine-contained artificial fire-log for providing not only firewood but also providing a collectable item.

Yet another object of the present invention is to provide a new figurine-contained artificial fire-log which includes an elongate flammable body being formed of particulate material such as compressed wood chips and sawdust and also being formed of a binder such as a chemical agent including wax; and a collectable figurine being disposed inside the elongate flammable body and including an animal-shaped figure such as an elephant which is made of fire-resistant material such as cast iron, cement, and ceramic.

Still yet another object of the present invention is to provide a new figurine-contained artificial fire-log that gives the user a surprise not found in other types of artificial fire-logs.

Even still another object of the present invention is to provide a new figurine-contained artificial fire-log that provides a product which is much more than being merely a perishable item.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
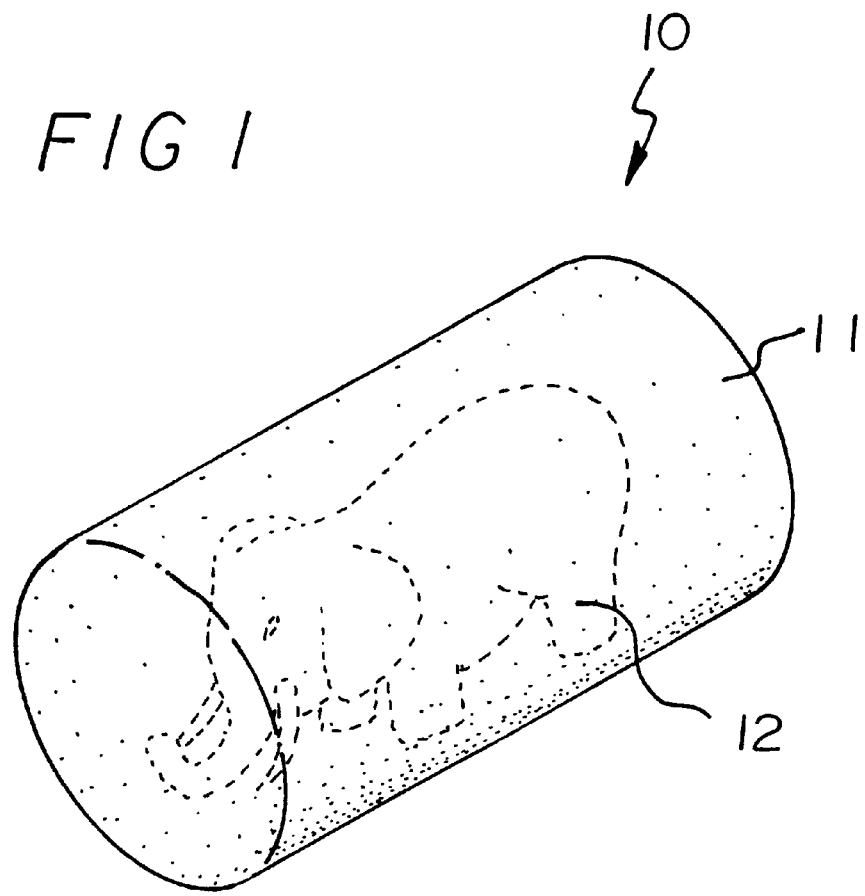
FIG. 1 is a perspective view of a new figurine-contained artificial fire-log according to the present invention.
Figure 2:
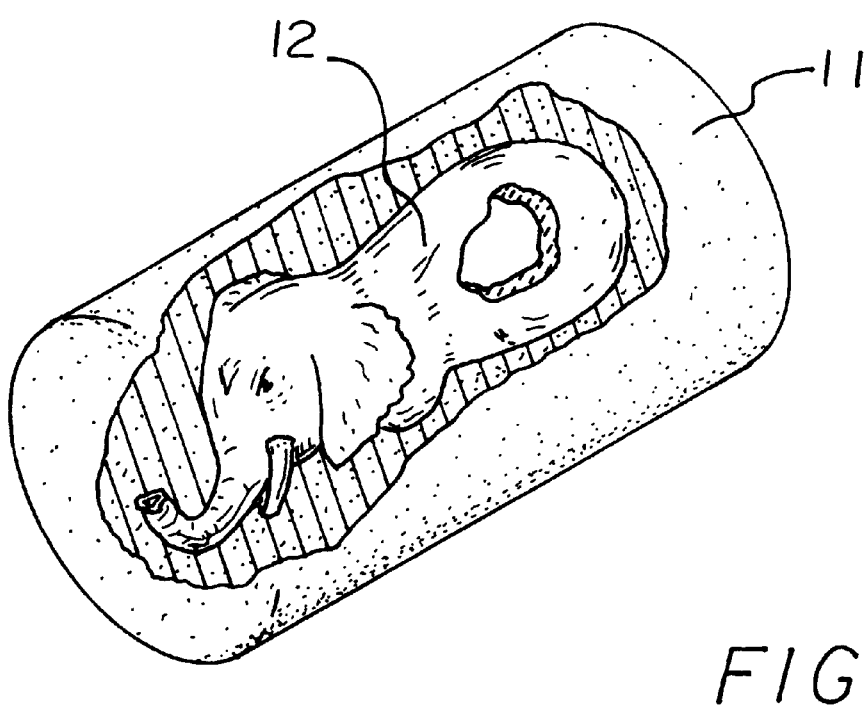
FIG. 2 is a perspective view of the present invention showing the collectable figurine disposed inside the fire-log.

With reference now to the drawings, and in particular to FIGS. 1 through 2 thereof, a new figurine-contained artificial fire-log embodying the principles and concepts of the present invention and generally designated by the reference numeral 10 will be described.

As best illustrated in FIGS. 1 through 2, the figurine-contained artificial fire-log 10 generally comprises an elongate flammable body 11 formed from particulate material and a binder. The particulate material includes compressed wood chips and sawdust, and the binder includes a chemical agent which includes wax. The elongate flammable body 11 is generally cylindrically shaped and is adapted to be burned in a fireplace. A collectable figurine 12 is disposed entirely inside the elongate flammable body 11 and is formed of fire-resistant material and is retrievable upon burning of the elongate flammable body 11. The collectable figurine 12 includes an animal-shaped figure which includes an elephant which is completely enclosed within the elongate flammable body 11.

As a first embodiment, the collectable figurine 12 is made of cast iron. As a second embodiment, the collectable figurine 12 is made of concrete, and as a third embodiment, the collectable figurine 12 is made of ceramic.

In use, the user places the figurine-contained artificial fire-log 10 in a fire such as a fireplace and allows the fire-log 10 to burn like any artificial fire-log. As the fire-log 10 burns away to ashes, the collectable figurine 12 is exposed from inside thereof. Once the fire is extinguished the user can remove and clean the collectable figurine 12 and keep it as a collectable item in the home.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A figurine containing artificial fire-log comprising:
   an elongate flammable body formed from particulate material and a binder, wherein said particulate material includes compressed wood chips and sawdust; and
   a figurine entirely disposed inside said elongate flammable body and being formed of fire-resistant material and being retrievable upon burning of said elongate flammable body.

2. A figurine containing fire-log as described in claim 1, wherein said binder includes wax.

3. A figurine containing fire-log as described in claim 1, wherein said elongate flammable body is generally cylindrically shaped and is adapted to be burned in a fireplace.

4. A figurine containing fire-log as described in claim 1, wherein said figurine includes an animal-shaped figure and is adapted to be entirely enclosed inside said elongate flammable body.

5. A figurine containing fire-log as described in claim 3, wherein said animal-shaped figure includes an elephant.

6. A figurine containing fire-log as described in claim 4, wherein said figurine is made of cast iron.

7. A figurine containing fire-log as described in claim 4, wherein said figurine is made of concrete.

8. A figurine containing fire-log as described in claim 4, wherein said figurine is made of ceramic.

9. A figurine containing artificial fire-log comprising:
   an elongate flammable body formed from particulate material and a binder, said particulate material including compressed wood chips and sawdust, said binder including wax, said elongate flammable body being generally cylindrically shaped and being adapted to be burned in a fireplace; and
   a figurine disposed inside said elongate flammable body and being formed of fire-resistant material and being retrievable upon burning of said elongate flammable body, said figurine including an animal-shaped figure which includes an elephant being entirely enclosed in said elongate flammable body.

10. A figurine containing fire-log as described in claim 9, wherein said figurine is made of cast iron.

11. A figurine containing fire-log as described in claim 9, wherein said figurine is made of concrete.

12. A figurine containing fire-log as described in claim 9, wherein said figurine is made of ceramic.

13. A figurine containing artificial fire-log comprising:

an elongate flammable body formed from a flammable particulate wood material and a wax to bind the particulate wood material together; and a figurine entirely disposed inside said elongate flammable body and being formed of fire-resistant material and being retrievable upon burning of said elongate flammable body.

* * * * *